United States Patent [19]

Jensen

[11] 4,165,118
[45] Aug. 21, 1979

[54] LOUVERED TAILGATE WITH AUTOMATICALLY ADJUSTABLE VANES

[75] Inventor: Edward A. Jensen, Salem, S. Dak.

[73] Assignee: Jenerl, Inc., Salem, S. Dak.

[21] Appl. No.: 862,657

[22] Filed: Dec. 20, 1977

[51] Int. Cl.$^2$ .............................................. B62D 35/00
[52] U.S. Cl. ................................... 296/50; 180/54 A
[58] Field of Search ............ 180/68 P, 54 A; 296/50, 296/51, 57 R, 91

[56] References Cited

U.S. PATENT DOCUMENTS

| 2,276,279 | 3/1942 | Asklund | 180/68 P |
| 2,707,031 | 4/1965 | Williams | 180/54 A |
| 4,063,772 | 12/1977 | Kincaid | 296/1 S |

*Primary Examiner*—Richard A. Bertsch
*Attorney, Agent, or Firm*—Williamson, Bains, Moore & Hansen

[57] ABSTRACT

The tailgate on a conventional pickup truck is provided with a plurality of vanes which pivot about their respective horizontal axes. Air pressure buildup in the pickup bed causes the vanes to pivot about the axis thereby relieving the air pressure buildup. The louvered vanes also provide for improved rearward vision from the cab of the pickup and are especially useful for trailer hookups.

4 Claims, 5 Drawing Figures

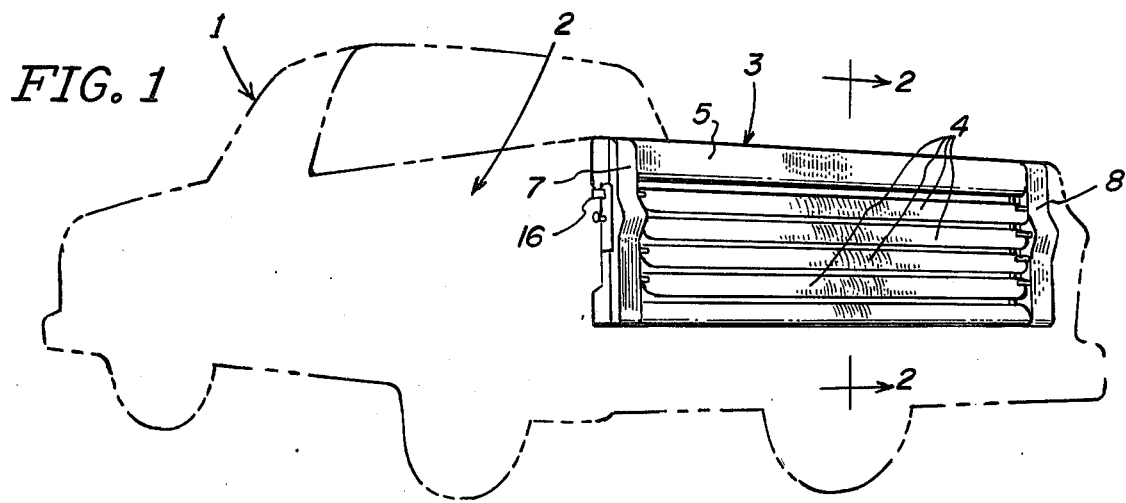
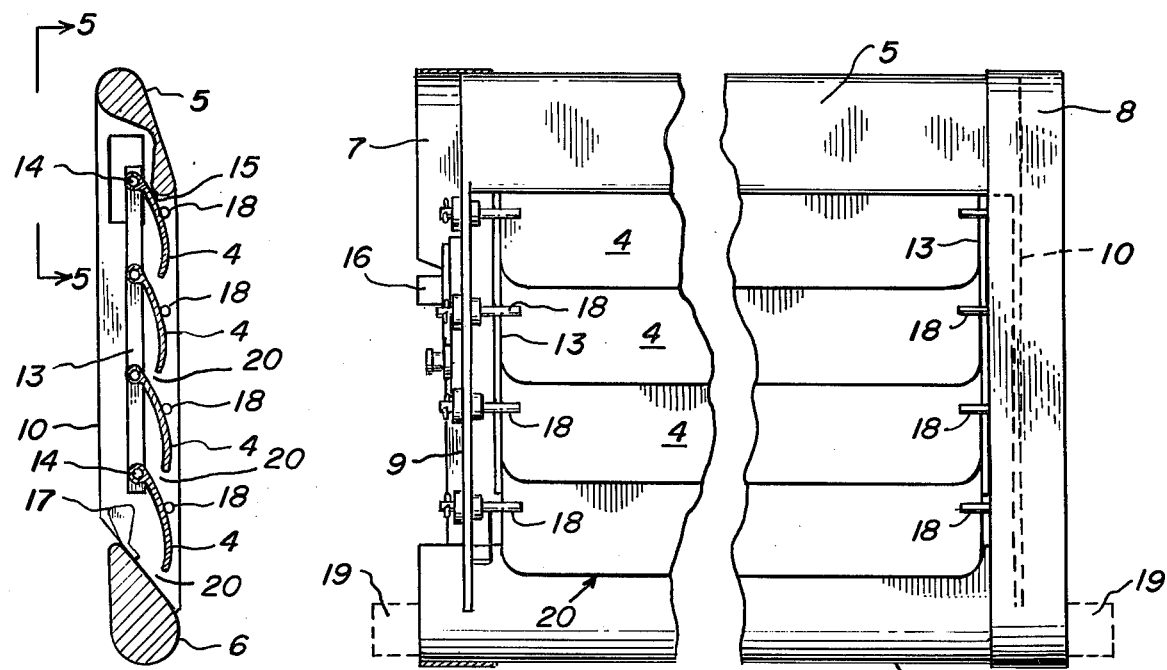

LOUVERED TAILGATE WITH AUTOMATICALLY ADJUSTABLE VANES

BRIEF SUMMARY OF THE INVENTION

This invention relates to tailgates of the type used commonly on pickup trucks for enclosing a load space. The primary objective of this invention is to provide such a tailgate so as to increase rearward vision from the cab of the pickup while at the same time relieving air pressure buildup in the bed of the pickup, thereby reducing drag and correspondingly increasing gas mileage. In the preferred form of my invention a plurality of hinged vanes are mounted in a pickup bed tailgate. It has been found that at highway speeds there is substantial air pressure buildup in the bed of a pickup truck. This pressure buildup produces aerodynamic drag on the truck thereby lessening gas mileage and performance in general.

Previous attempts to reduce vehicle drag have been many and varied. The use of fixed vents and louvers in the fender tops of racing cars is well-known in order to relieve pressure buildup beneath the car. Other pieces of prior art have typically used various air foils and deflectors in order to guide air around corners of bulky vehicles such as tractor trailers and buses. Such efforts are typified in U.S. Pat. Nos. 3,929,369 to Blair; 2,569,983 to Favre; 2,122,422 to Huet; and 1,584,275 to Chalkley, as well as French Pat. No. 1,575,907 to Maire. The aforementioned patents all use added air foils and deflectors in conjunction with the existing structure in order to tailor the pressure gradients in a more desirable fashion. Also of interest is French Pat. No. 2,237,462, also to Maire. In Maire a plurality of movable vanes are fixed to the rear of a vehicle and apparently pivot to provide the optimum desired air flow. A particularly advantageous feature of my invention resides in the utilization of pivotable vanes which react to air pressure buildup in the pickup bed and open to relieve that pressure. The utility and versatility of the louvered tailgate is further improved in that the louvered openings provide additional vision to the rear of the truck in order to improve ease of trailer hookup and detection of objects hidden by a conventional tailgate. It is a further object of the invention that by relieving the pickup bed pressure buildup that gas mileage might be improved while at the same time serving to restrain any load located in the pickup bed. These and other objects and advantages of my invention will become readily apparent as the following description is read in conjunction with the accompanying drawings wherein like reference numerals are used to describe the several views.

DESCRIPTION OF THE DRAWING FIGURES

FIG. 1 is a perspective view of the tailgate as mounted on a pickup truck. (Shown in phantom)

FIG. 2 is a sectional view of the louvered tailgate taken along lines 2—2 of FIG. 1 showing the tailgate in the closed position.

FIG. 3 is the same view as FIG. 2 except that the louvers are shown in the opened position.

FIG. 4 is a plan view of the tailgate with a portion cut away to show the mounting mechanism.

FIG. 5 shows details of the louver mounting system.

DESCRIPTION OF THE PREFERRED EMBODIMENT

Referring specifically to FIG. 1, there is shown a pickup truck generally indicated at 1 and having a pickup bed 2. Located at the rear of pickup bed 2 is a louvered tailgate, generally 3 having a plurality of adjustable vanes or louvers 4.

Referring to FIGS. 2-5 tailgate 3 is comprised generally of a top fixed section 5, a bottom 6 and sides 7 and 8. Each side is provided with a mounting flange as indicated at 9 and 10. Each of the louvers 4 is essentially in the shape of an arcuate, elongated member which has attached near the center thereof at either end pivot pins 18 which may be affixed by welding or other known methods. Pivot pins 18 extend into flanges 9 and 10 and pivot in bushings 11 mounted in said flanges 9 and 10. Bushings 11 may be made of nylon, Delrin, bronze or any other well known bushing material. Preferably these bushings provide a smooth and free pivoting action. Pivot pins 18 and attached vanes or louvers 4 are retained in place by cotter pins 12 or any other known restraining means such as a flange.

Preferably a greater cross-sectional area of vane 4 lies below pivot pin 18 than lies above. In this manner a pressure buildup inside the pickup bed will exert a greater force on the portion of the vane below the pivot pin than above therefore tending to swing the bottom of the vane upwardly. Such geometry will also assure that gravity will act to urge the vanes toward a closed position upon the slowing of the vehicle, as shown in FIG. 2. In order to assure uniform opening of the louvers, connecting strips 13 are supplied. Connecting strips 13 are pivotably attached to the top end of each of the respective louvers by pins 14 and cotter pins 12 in a manner similar to that by which pivot pins 18 pivot in frame sides 9 and 10. The action of connecting strip 13 thus assures a parallelogram type of motion of the various louvers so that they will open in concert. Surface 15 of top rail 5 serves to provide a stop for the top vane, and due to the action of connecting strip 13 assures that the various louvers 4 do not close completely such that a certain amount of continuous rearward vision may be maintained as shown in FIG. 2 through spaces 20.

Further, tailgate latches 16 are provided in side rails 7 and 8. Latches 16 represent conventional pickup bed latches which are preferably removed from the original factory tailgate and attached to the louvered tailgate. The associated latch mechanisms are also conventional. Hinging is provided by conventional pickup hinge assemblies 19.

Thus, for operation of the device, when the pickup is in the resting position as shown in FIG. 2 surface 15 positions the upper louver such that when the other louvers assume a corresponding position spaces 20 are provided so that the driver may see through the tailgate to a certain degree. As the truck assumes a highway speed, air pressure buildup in the pickup bed 2 exerts a force on the inner side of louvers 4; and due to the greater surface area of louvers 4 below pivot pins 18, the louvers are forced into an open position as noted in FIG. 3. A stop 17 is provided such that connecting strip 13 will contact stop 17 and thus limit the opening of louvers at their most efficient position, such as that shown in FIG. 3.

Although I have described my louvered tailgate assembly with respect to a particular preferred embodiment thereof, I anticipate that various changes may be made in the size, shape and operation of the various components of the louvered tailgate without departing from the spirit and scope of my invention as defined by the following claims.

What is claimed is:

1. A drag reducing and vision augmenting device for a pickup truck comprising:
   a tailgate for mounting at the rear of a pickup bed, said tailgate having a plurality of louvers, each of said louvers being pivotable about a horizontal axis between an open position and a closed position, said louvers being substantially vertical when in said closed position and each of said louvers having more frontal area below its respective axis than above its respective axis such that when said truck is in motion, air pressure buildup in said bed will cause said louvers to move to said open position so as to relieve said pressure buildup in said pickup bed and such that when said truck is at rest, gravity will cause said louvers to assume said lowered position, said louvers being spaced so as to allow vision therebetween from the cab of said pickup when said louvers are in said closed position.

2. The device of claim 1 wherein said louvers are interconnected to provide uniform coordinated opening.

3. The device of claim 1 wherein said axes are arranged in a vertically spaced parallel array.

4. The device of claim 3 wherein each of said louvers has a top edge and a bottom edge, each bottom edge being located outwardly relative to said pickup bed from the top edge of the louver thereunder so as to allow vision from the pickup cab between the adjacent edges while presenting a solid appearance when viewed from behind the truck.

* * * * *